United States Patent
Matsumoto et al.

(10) Patent No.: US 8,382,185 B2
(45) Date of Patent: Feb. 26, 2013

(54) TILT-DOWN VEHICLE SEAT

(75) Inventors: Keigo Matsumoto, Toyota (JP); Keisuke Hoshino, Nisshin (JP); Kou Ishikawa, Toyota (JP)

(73) Assignee: Toyota Boshoku Kabushiki Kaisha, Kariya-Shi (JP)

( * ) Notice: Subject to any disclaimer, the term of this patent is extended or adjusted under 35 U.S.C. 154(b) by 298 days.

(21) Appl. No.: 12/624,474

(22) Filed: Nov. 24, 2009

(65) Prior Publication Data
US 2010/0133871 A1 Jun. 3, 2010

(30) Foreign Application Priority Data
Nov. 28, 2008 (JP) ................................. 2008-303997

(51) Int. Cl.
*B60N 2/20* (2006.01)
*B60N 2/02* (2006.01)
(52) U.S. Cl. ..................... 296/65.18; 297/335
(58) Field of Classification Search ............... 296/65.18, 296/65.09, 65.05, 65.08, 65.17, 65.16; 297/335, 297/336, 378.1, 378.12, 344.1, 463.1; *B60N 2/20, B60N 2/02*
See application file for complete search history.

(56) References Cited

U.S. PATENT DOCUMENTS

| | | | |
|---|---|---|---|
| 4,840,427 A * | 6/1989 | Hong | 297/344.14 |
| 6,070,934 A * | 6/2000 | Schaefer et al. | 297/14 |
| 6,089,641 A * | 7/2000 | Mattarella et al. | 296/64 |
| 6,382,491 B1 * | 5/2002 | Hauser et al. | 296/65.05 |
| 7,014,263 B2 * | 3/2006 | Mukoujima et al. | 297/341 |
| 7,073,862 B2 * | 7/2006 | Lavoie | 297/378.13 |
| 7,300,107 B2 * | 11/2007 | Kammerer | 297/336 |
| 2002/0125753 A1 * | 9/2002 | Kammerer | 297/331 |
| 2005/0116493 A1 * | 6/2005 | Falchero et al. | 296/65.09 |
| 2009/0051202 A1 | 2/2009 | Ozeki et al. | |
| 2009/0243359 A1 | 10/2009 | Yoshida et al. | |
| 2009/0302633 A1 | 12/2009 | Kuno | |

FOREIGN PATENT DOCUMENTS

| | | |
|---|---|---|
| FR | 2804072 | 7/2001 |
| JP | 2005-280501 | 10/2005 |

* cited by examiner

*Primary Examiner* — Glenn Dayoan
*Assistant Examiner* — Sunsurraye Westbrook
(74) *Attorney, Agent, or Firm* — Greenblum & Bernstein, P.L.C.

(57) ABSTRACT

A tilt-down vehicle seat including: a base member on a vehicle floor; a seatback connected to the base member via a reclining mechanism; a seat cushion that moves downward as the seatback is tilted downward; a front link pivotally fitted at a lower portion to the base member and at an upper portion to a front portion of the seat cushion; a guide mechanism that slidably supports a rear portion of the seat cushion and guides the rear portion in such a manner that the rear portion slides relative to the base member in the fore-and-aft and up-and-down directions; a seatback-connected member that moves in accordance with a movement of the seatback; and an interlocking link pivotally connected at a front portion to the front link and at a rear portion to the seatback-connected member, which causes the seat cushion to move in accordance with the movement of the seatback.

9 Claims, 2 Drawing Sheets

TILT-DOWN VEHICLE SEAT

INCORPORATION BY REFERENCE

The disclosure of Japanese Patent Application No. 2008-303997 filed on Nov. 28, 2008 including the specification, drawings and abstract is incorporated herein by reference in its entirety.

BACKGROUND OF THE INVENTION

1. Field of the Invention

The invention relates generally to a vehicle seat that is mounted in a vehicle, for example, a car, and more specifically to a tilt-down vehicle seat in which a seat cushion moves downward as a seatback is tilted downward.

2. Description of the Related Art

In a tilt-down vehicle seat described in Japanese Patent Application Publication No. 2005-280501 (JP-A-2005-280501), as a seatback is tilted downward, a seat cushion moves downward. Thus, the seat is lowered. As a result, a space for baggage is obtained. A vehicle seat of this type usually includes a base member that is provided on a vehicle floor, a lower arm that is pivotally connected to a rear portion of the base member, a seatback that is pivotally connected to an upper portion of the lower arm via a reclining mechanism, a front link and a rear link that connect a seat cushion to the base member and that may pivot with respect to the base member, a connection link that is pivotally connected to a middle portion of the front link and the lower arm, and a lock mechanism that locks the lower arm to the base member. Therefore, when locking provided by the lock mechanism is cancelled and the seatback is tilted downward, the seatback and the lower arm are tilted down with respect to the base member, the lower arm pushes the connection link, the front link is tilted downward by the connection link, and the rear link is also tilted downward. Thus, the seat cushion moves downward in a substantially horizontal position.

French Patent Application Publication No. 2804072 describes a vehicle seat which includes a base member that is provided on a vehicle floor, a front seat cushion and a rear seat cushion which are separate members, a seatback that is pivotally connected to the base member via a reclining mechanism, at a position posterior to the rear seat cushion; a front link that connects a front end portion of the front seat cushion with the vehicle floor and that may pivot with respect to the vehicle floor; a guide mechanism that slidably supports a rear end portion of the front seat cushion and guides the rear end portion in such a manner that the rear end portion slides with respect to the base member, and an interlocking mechanism that causes the front seat cushion to move in accordance with the movement of the seatback.

The guide mechanism has a guide pin provided at the rear end portion of the front seat cushion, and an elongate guide groove which is formed in the base member and in which the guide pin is fitted. The link mechanism includes an arm that moves in accordance with the seatback, a first connection link, and a second connection link. The first connection link is pivotally connected to the second connection link at a portion near the guide pin, and the arm. The second connection link is pivotally connected to the first connection link and a lower portion of the seat cushion. Therefore, when the seatback is tilted downward, the first connection link pulls the second connection link and the second connection link pulls the rear end portion of the front seat cushion. Thus, the rear end portion of the front seat cushion is moved rearward and downward by the guide mechanism, and the front end portion of the front seat cushion is moved downward because the front link is tilted downward.

The paths, along which the front portion and the rear portion of the seat cushion described in JP-A-2005-280501 are moved, are set to arc-shaped paths because the paths along which the front link and the rear link pivot are arc-shaped. Therefore, the path along which the seat cushion is moved is not flexibly selected. Accordingly, when the seat cushion moves in accordance with the movement of the seatback, the seat cushion and the seatback may interfere with each other, which hinders a smooth operation of the seat. As a result, an operation load required to change the position of the seat may be increased. The connection structure described in French Patent Application Publication No. 2804072 includes two or more connection links. In addition, in order to set the pivot points of the connection links to desired positions, the connection links and the base member need to be formed in complicated shapes.

SUMMARY OF THE INVENTION

The invention provides a simply-structured tilt-down vehicle seat where a path along which a seat cushion is moved is easily set to a desired path.

An aspect of the invention relates to a tilt-down vehicle seat which includes a base member that is provided on a vehicle floor; a seatback that is connected to the base member via a reclining mechanism so that a reclining angle of the seatback is adjustable; a seatback-connected member that moves in accordance with a movement of the seatback; a seat cushion that moves downward as the seatback is tilted downward; a front link that is pivotally fitted at a lower portion to the base member, and that is pivotally fitted at an upper portion to a front portion of the seat cushion; a guide mechanism that slidably supports a rear portion of the seat cushion and that guides the rear portion of the seat cushion in such a manner that the rear portion of the seat cushion slides with respect to the base member in a fore-and-aft direction and an up-and-down direction; and an interlocking link that is pivotally connected at a front portion to the front link, that is pivotally connected at a rear portion to the seatback-connected member, and that causes the seat cushion to move in accordance with the movement of the seatback.

Therefore, when the seatback is tilted downward, the front link is tilted downward by the interlocking link, and the front portion of the seat cushion moves downward. The rear portion of the seat cushion is slid downward by the guide mechanism. Thus, the seat cushion is moved downward as the seatback is tilted downward. The guide mechanism has the structure with which the rear portion of the seat cushion is slidably supported and guided. Therefore, it is possible to appropriately set the path, along which the rear portion of the seat cushion is moved, by appropriately setting the shape of a portion of the guide mechanism, which supports and guides the rear portion. Thus, it is possible to prevent interference between the seat cushion and the seatback, which hinders a smooth operation of the seat. As a result, it is possible to operate the seat more easily. Also, the simple structure, that is, the interlocking link, which connects the component connected to the seatback to the front link, enables the seat cushion to move in accordance with the movement of the seatback.

In the above-described aspect, the front link and the interlocking link may be connected to the seat cushion at the same position. Therefore, the interlocking link is connected to the upper portion of the front link and applies a force to the upper portion of the front link. The front link may receive a higher moment from the interlocking link than when a middle portion of the front link in its longitudinal direction receives a force from the interlocking link. Thus, the front link may be stably tilted by the interlocking link. The interlocking link and the front link are fitted to the seat cushion at the same position. Therefore, the interlocking link and the front link are fitted to the seat cushion with a single pin. As a result, the number of components is reduced.

In the above-described aspect, the guide mechanism may have a projection formed at the rear portion of the seat cushion, and a guide groove which is formed in the base member, in which the projection is fitted, which supports the projection, and which guides the projection in the fore-and-aft direction and the up-and-down direction. In addition, the projection and the guide groove may be positioned posterior to the reclining mechanism. Therefore, the rear portion of the seat cushion is always supported by the guide mechanism at a position posterior to the reclining mechanism. Accordingly, the distance between the position at which the seat cushion is supported by the guide mechanism and the position at which the seat cushion is supported by the front link is relatively long in the fore-and-aft direction. Therefore, the seat cushion is stably supported without rattling greatly, and moved stably.

BRIEF DESCRIPTION OF THE DRAWINGS

The features, advantages, and technical and industrial significance of this invention will be described in the following detailed description of an example embodiment of the invention with reference to the accompanying drawings, in which like numerals denote like elements, and wherein.

DETAILED DESCRIPTION OF THE EMBODIMENT

Figure 1:
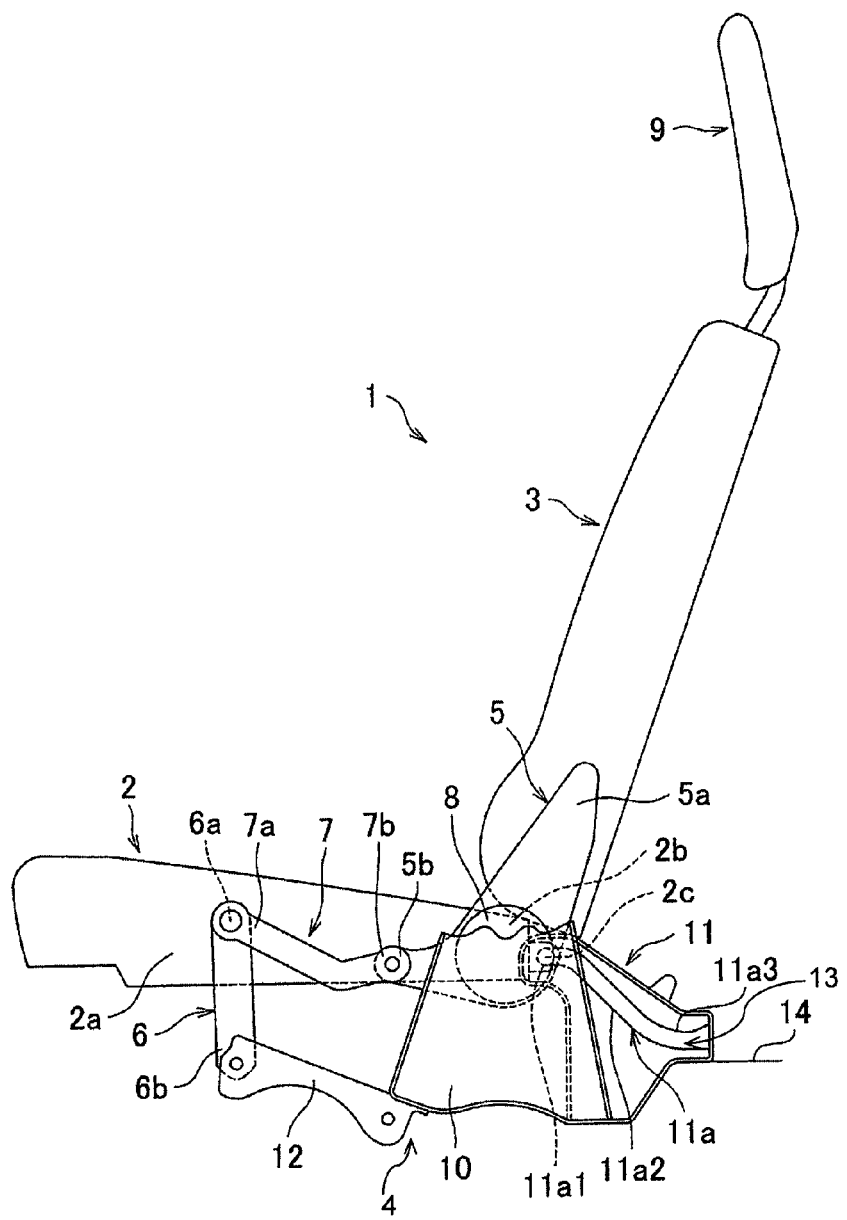
FIG. 1 is a left side view of a vehicle seat in the usage state.

An embodiment of the invention will be described with reference to FIGS. 1 to 3. As shown in FIG. 1, a seat 1 is mounted in a vehicle, for example, a car, and includes a seat cushion 2 on which a user is seated, a seatback 3 that supports the back of the user, a headrest 9 that protects the head of the user, and a base member 4 that is fitted to a vehicle floor 14.

As shown in FIG. 1, the base member 4 includes a lower arm 10, a guide member 11 that is provided at a position proximal to the center of the seat 1 than the lower arm 10, and a bracket 12 that is provided anterior to the lower arm 10. An upper arm 5 is connected to an upper portion of the lower arm 10 in such a manner that the angle of the upper arm 5 may be adjusted by a reclining mechanism 8. The upper arm 5 includes a first projection 5a that projects upward from the reclining mechanism 8 when the seat 1 is in the usage state, and a second projection 5b that projects forward from the reclining mechanism 8 when the seat 1 is in the usage state. The first projection 5a is attached to a lower portion of the seatback 3. Therefore, the seatback 3 is connected to the base member 4 via the reclining mechanism 8 and the upper arm 5 so that the angle of the seatback 3 is adjustable.

Figure 2:
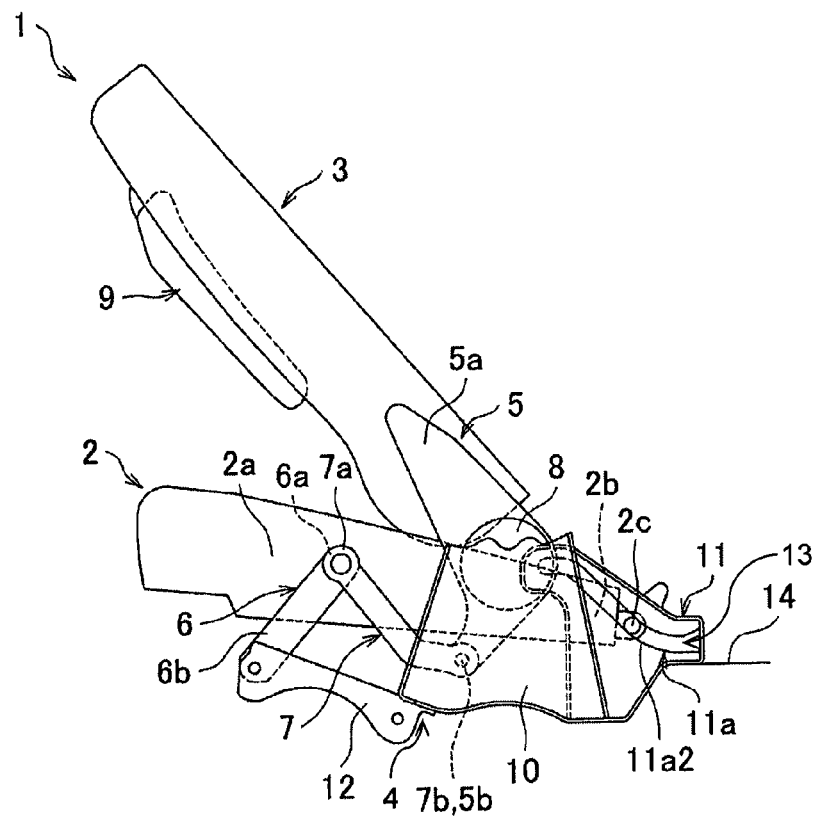
FIG. 2 is a left side view of the vehicle seat in the state that is achieved between the usage state and the tilted-down state.
Figure 3:
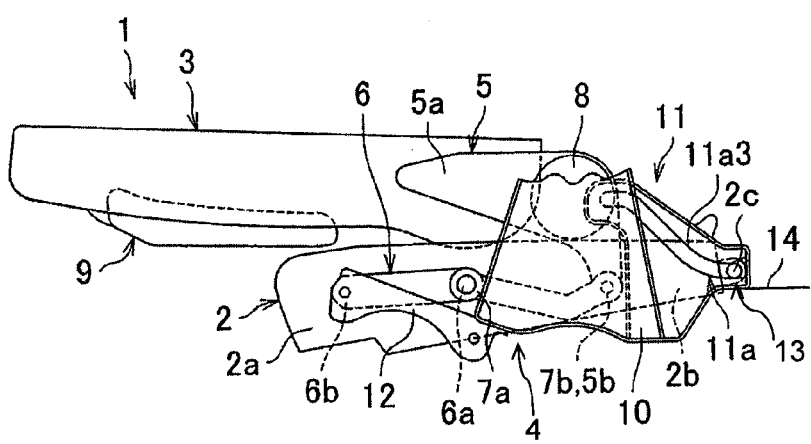
FIG. 3 is a left side view of the vehicle seat in the tilted-down state.

As shown in FIGS. 1 to 3, the guide member 11 is attached to the vehicle floor 14 at a portion posterior to and below the reclining mechanism 8. A guide mechanism 13, which slidably supports a rear portion 2b of the seat cushion 2 and guides the rear portion 2b in such a manner that the rear portion 2b slides with respect to the base member 4, is provided between the guide member 11 and the seat cushion 2. The guide mechanism 13 has a guide groove 11a that is formed in the guide member 11 and a projection 2c that is formed at the rear portion 2b of the seat cushion 2.

As shown in FIG. 1, the guide groove 11a is an elongate hole, and has a front horizontal portion 11a1 that extends from a front upper position of the guide member 11 rearward and substantially horizontally, a sloped portion 11a2 that extends from a rear portion of the front horizontal portion 11a1 obliquely downward and rearward, and a rear horizontal portion 11a3 that extends from a rear portion of the sloped portion 11a2 rearward and substantially horizontally. The projection 2c has, for example, a column shape, and projects laterally from the rear portion 2b of the seat cushion 2. The projection 2c is fitted in the guide groove 11a and supported so as to be moved along the guide groove 11a in the fore-and-aft direction and obliquely upward and downward.

A front link 6 is provided between the seat cushion 2 and the bracket 12, as shown in FIGS. 1 to 3. An upper portion 6a of the front link 6 is pivotally fitted to a front portion 2a (which is at a position anterior to the center of the seat cushion 2 in the fore-and-aft direction) of the seat cushion 2. A lower portion 6b of the front link 6 is pivotally fitted to a front portion of the bracket 12. Therefore, as the front link 6 is moved, the front portion 2a of the seat cushion 2 moves in the up-and-down direction and the fore-and-aft direction along an arc-shaped path.

An interlocking link 7, which causes the seat cushion 2 to move in accordance with the movement of the seatback 3, is provided between the front link 6 and the upper arm 5, as shown in FIGS. 1 to 3. A front portion 7a of the interlocking link 7 is pivotally connected to the upper portion 6a of the front link 6. A rear portion 7b of the interlocking link 7 is pivotally connected to a front end portion of the second projection 5b of the upper arm 5. The interlocking link 7 and the front link 6 are fitted to the seat cushion 2 at the same position. Preferably, the front portion 7a of the interlocking link 7 and the upper portion 6a of the front link 6 are pivotally connected to a frame of the seat cushion 2 with a single pin.

The angle of the seatback 3 is adjusted by the reclining mechanism 8, the seatback 3 is locked by the reclining mechanism 8, and the seatback 3 is held at a predetermined angle in the usage state shown in FIG. 1. When the seatback 3 is at the predetermined angle, the seatback 3 is tilted rearward. The headrest 9 is pivotally attached to an upper portion of the seatback 3 in such a manner that the headrest 9 may pivot within a predetermined angle range. The headrest 9 extends upward from the upper portion of the seatback 3 in the usage state shown in FIG. 1, and is placed on the front face of the seatback 3 (under the seatback 3) in the tilted-down state shown in FIG. 3.

When the seat 1 is placed in the usage state, the upper arm 5 is locked to the lower arm 10 by the reclining mechanism 8 so that the upper arm 5 is not allowed to pivot with respect to the lower arm 10. Therefore, tilting of the front link 6 is restricted via the upper arm 5 and the interlocking link 7. Thus, the front link 6 is held upright with respect to the bracket 12, and the seat cushion 2 is held at the position shown in FIG. 1. The rear portion 2b of the seat cushion 2 is stably held at the height in the usage state because the projection 2c is in the front horizontal portion 11a1 of the guide groove 11a.

When the seat 1 is shifted from the usage state shown in FIG. 1 to the tilted-down state shown in FIG. 3, first, the headrest 9 is tilted forward so as to be overlapped with the seatback 3 as shown in FIG. 2, and the reclining mechanism 8 is placed in the unlock state by an unlock lever (not shown).

Thus, the seatback 3 is liftable with respect to the lower arm 10. In this state, the seatback 3 is tilted down onto the seat cushion 2, and the upper arm 5 pivots with respect to the lower arm 10 together with the seatback 3.

When the upper arm 5 pivots counterclockwise, the upper arm 5 pulls the interlocking link 7 rearward and the interlocking link 7 pulls the upper portion 6a of the front link 6 rearward as shown in FIGS. 2 and 3. Thus, the front link 6 is tilted rearward, and the front portion 2a of the seat cushion 2 moves rearward and downward along an arc-shaped path. The rear portion 2b of the seat cushion 2 moves rearward and downward under the guidance of the guide mechanism 13. As a result, the seat cushion 2 moves downward as the seatback 3 is tilted downward.

When the seat 1 is placed in the tilted-down state shown in FIG. 3, the front link 6 extends substantially horizontally, and the projection 2c is positioned in the rear horizontal portion 11a3 of the guide groove 11a. In this way, the seat cushion 2 is lowered from the height in the usage state in FIG. 1 to the height in the tilted-down state in FIG. 3. Thus, the position of the seat 1 is lower in the tilted-down state than in the usage state, and a space for baggage is obtained. When the seat 1 is shifted from the tilted-down state to the usage state, the seatback 3 is raised from the substantially horizontal position in the reverse procedure to how the seat 1 is placed in the tilted-down state. The shape of the guide groove 11a is set to such a shape that interference between the seatback 3 and the seat cushion 2, which hinders a smooth operation of the seat 1, does not occur when the seat cushion 2 moves in accordance with the movement of the seatback 3.

As shown in FIGS. 1 to 3, the seat 1 described above includes the front link 6, the guide mechanism 13, and the interlocking link 7. Therefore, when the seatback 3 is tilted downward, the front link 6 is tilted downward by the interlocking link 7, and the front portion 2a of the seat cushion 2 moves downward. The rear portion 2b of the seat cushion 2 is slid downward by the guide mechanism 13. Thus, the seat cushion 2 is moved downward as the seatback 3 is tilted downward.

The guide mechanism 13 has the structure with which the rear portion 2b of the seat cushion 2 is slidably supported and guided. Therefore, it is possible to appropriately set the path, along which the rear portion 2b of the seat cushion 2 is moved, by appropriately setting the shape of a portion of the guide mechanism 13, which supports and guides the rear portion 2b, that is, the guide groove 11a. Thus, it is possible to prevent interference between the seat cushion 2 and the seatback 3, which hinders a smooth operation of the seat 1. As a result, it is possible to operate the seat 1 more easily. Also, the simple structure, that is, the interlocking link 7, which connects the component connected to the seatback 3 to the front link 6, enables the seat cushion 2 to move in accordance with the movement of the seatback 3.

The guide mechanism 13 has the projection 2c and the guide groove 11a, as shown in FIGS. 1 to 3. The projection 2c and the guide groove 11a are positioned posterior to the reclining mechanism 8. Therefore, the rear portion 2b of the seat cushion 2 is always supported by the guide mechanism 13 at a position posterior to the reclining mechanism 8. Accordingly, the distance between the position at which the seat cushion 2 is supported by the guide mechanism 13 and the position at which the seat cushion 2 is supported by the front link 6 is relatively long in the fore-and-aft direction. Therefore, the seat cushion 2 is stably supported without rattling greatly, and moved stably.

As shown in FIGS. 1 to 3, the upper portion 6a of the front link 6 and the front portion 7a of the interlocking link 7 are fitted to the seat cushion 2 at the same position. Therefore, the interlocking link 7 is connected to the upper portion 6a of the front link 6 and applies a force to the upper portion 6a of the front link 6. The front link 6 may receive a higher moment from the interlocking link 7 than when a middle portion of the front link 6 in its longitudinal direction receives a force from the interlocking link 7. Thus, the front link 6 may be stably tilted by the interlocking link 7. The interlocking link 7 and the front link 6 are fitted to the seat cushion 2 at the same position. Therefore, the interlocking link 7 and the front link 6 are fitted to the seat cushion 2 with a single pin. As a result, the number of components is reduced.

The invention is not limited to the above-described embodiment, and may be implemented in, for example, the following embodiments.

1) The base member 4 in the above-described embodiment is immovably fitted to the vehicle floor 14. Alternatively, the base member 4 may be fitted to a slide rail mechanism that is provided on the vehicle floor 14 so that the base member 4 is movable with respect to the vehicle floor 14.

2) In the above-described embodiment, when the seat 1 is shifted from the usage state to the tilted-down state, the front link 6 is tilted rearward and the seat cushion 2 is moved rearward and downward. Alternatively, the front link may be tilted forward, and the seatback may be moved forward and downward.

3) The guide mechanism 13 in the above-described embodiment has the projection 2c formed at the seat cushion 2 and the guide groove 11a formed in the guide member 11. Alternatively, the guide mechanism may have a projection formed at the guide member and a guide groove formed in a seat cushion-connected member, and the projection may be fitted in the guide groove so that the projection is supported and guided in the guide groove.

4) The front portion 7a of the interlocking link 7 in the above-described embodiment is pivotally fitted to the upper portion 6a of the front link 6. Alternatively, the front portion of the interlocking link may be pivotally fitted to, for example, a middle portion of the front link.

5) The guide mechanism 13 in the above-described embodiment has the elongated guide groove 11a, and the projection 2c is fitted in the guide groove 11a. Alternatively, the guide mechanism may have an upper edge of the guide member, and the projection may be slidably placed on the upper edge.

6) The projection 2c and the guide groove 11a in the above-described embodiment are positioned posterior to the reclining mechanism 8. Alternatively, the projection and the guide groove may be positioned anterior to the reclining mechanism 8.

7) The reclining angle at which the seatback 3 is locked by the reclining mechanism 8 may be adjusted by the reclining mechanism 8 at intervals of, for example, 1.5, 2 or 3 degrees. Alternatively, the reclining angle at which the seatback 3 is locked by the reclining mechanism 8 may be continuously adjusted by the reclining mechanism 8. When the reclining angle at which the seatback 3 is locked by the reclining mechanism 8 is adjusted by the reclining mechanism 8 at predetermined angle intervals, the seatback 3 may be locked only if the reclining angle is within the range of angles at which an occupant may be seated in the seat 1 and the seatback 3 may not be locked if the reclining angle is within the other angle range. Alternatively, the seatback 3 may be locked by the reclining mechanism 8 at predetermined angle intervals within the entire angle range. Further alternatively, the seatback 3 need not be locked by the reclining mechanism 8 when the seat 1 is in the tilted-down state. In another example, the reclining mechanism 8 may be used just as a hinge, and the seatback 3 may not be locked by the reclining mechanism 8 within the entire angle range. In this case, for example, the upper end of the seatback 3 and a vehicle body-side member need to be locked to each other by a connection device, for example, an interlock and a striker.

What is claimed is:

1. A tilt-down vehicle seat, comprising:
   a base member that is provided on a vehicle floor;
   a seatback that is connected to the base member via a reclining mechanism so that a reclining angle of the seatback is adjustable;
   an upper arm that moves in accordance with a movement of the seatback;
   a seat cushion that moves downward as the seatback is tilted downward;
   a front link that is pivotally fixed at a lower portion to the base member, and that is pivotally fitted at an upper portion to a front portion of the seat cushion, such that the front link pivots relative to the base member and the lower portion is held to a predetermined position on the base member;
   a guide mechanism that slidably supports a rear portion of the seat cushion and that guides the rear portion of the seat cushion in such a manner that the rear portion of the seat cushion slides with respect to the base member in a fore-and-aft direction and an up-and-down direction; and
   an interlocking link that is pivotally connected at a front portion to the front link, that is pivotally connected at a rear portion to the upper arm, and that causes the seat cushion to move in accordance with the movement of the seatback.

2. The tilt-down vehicle seat according to claim 1, wherein the front link and the interlocking link are connected to the seat cushion at a same position.

3. The tilt-down vehicle seat according to claim 2, wherein the upper portion of the front link and a front portion of the interlocking link are connected to the seat cushion with a single pin.

4. The tilt-down vehicle seat according to claim 2, wherein the guide mechanism has a projection formed at the rear portion of the seat cushion, and a guide groove which is formed in the base member, in which the projection is fitted, which supports the projection, and which guides the projection in the fore-and-aft direction and the up-and-down direction, and
   the projection and the guide groove are positioned posterior to the reclining mechanism.

5. The tilt-down vehicle seat according to claim 4, wherein the guide groove has a front horizontal portion that extends from an upper position of the base member rearward and substantially horizontally, a sloped portion that extends from a rear portion of the front horizontal portion obliquely downward and rearward, and a rear horizontal portion that extends from a rear portion of the sloped portion rearward and substantially horizontally.

6. The tilt-down vehicle seat according to claim 1, wherein the guide mechanism has a projection formed at the rear portion of the seat cushion, and a guide groove which is formed in the base member, in which the projection is fitted, which supports the projection, and which guides the projection in the fore-and-aft direction and the up-and-down direction, and
   the projection and the guide groove are positioned posterior to the reclining mechanism.

7. The tilt-down vehicle seat according to claim 6, wherein the guide groove has a front horizontal portion that extends from an upper position of the base member rearward and substantially horizontally, a sloped portion that extends from a rear portion of the front horizontal portion obliquely downward and rearward, and a rear horizontal portion that extends from a rear portion of the sloped portion rearward and substantially horizontally.

8. The tilt-down vehicle seat according to claim 1, wherein the guide mechanism has a projection formed at the base member, and a guide groove which is formed in a seat cushion-connected member, in which the projection is fitted, which supports the projection, and which guides the projection in the fore-and-aft direction and the up-and-down direction.

9. The tilt-down vehicle seat according to claim 1, wherein the guide mechanism has a projection formed at the rear portion of the seat cushion and an upper edge of the base member, and
   the projection is slidably placed on the upper edge.

* * * * *